United States Patent
Jang et al.

(10) Patent No.: US 10,467,449 B2
(45) Date of Patent: Nov. 5, 2019

(54) TOUCH PANEL AND DISPLAY DEVICE INCLUDING THE SAME

(71) Applicant: Samsung Display Co., Ltd., Yongin-si, Gyeonggi-do (KR)

(72) Inventors: Hyoungwook Jang, Sejong-si (KR); Jeongyun Han, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/677,946

(22) Filed: Aug. 15, 2017

(65) Prior Publication Data

US 2018/0068156 A1    Mar. 8, 2018

(30) Foreign Application Priority Data

Sep. 2, 2016    (KR) .................. 10-2016-0113169

(51) Int. Cl.
   *G06K 9/00*     (2006.01)
   *G06F 3/041*    (2006.01)
   *G06F 3/044*    (2006.01)

(52) U.S. Cl.
   CPC .......... *G06K 9/0002* (2013.01); *G06F 3/044* (2013.01); *G06F 3/0416* (2013.01); *G06K 9/00* (2013.01); *G06F 2203/04111* (2013.01); *G06F 2203/04112* (2013.01)

(58) Field of Classification Search
CPC combination set(s) only.
See application file for complete search history.

(56) References Cited

U.S. PATENT DOCUMENTS

| | | | |
|---|---|---|---|
| 8,564,314 B2 | 10/2013 | Shaikh et al. | |
| 2015/0254491 A1* | 9/2015 | Mo | G06F 3/0416 345/174 |
| 2015/0286317 A1* | 10/2015 | Shepelev | G06F 3/0416 345/174 |
| 2016/0350571 A1* | 12/2016 | Han | G06K 9/0002 |
| 2017/0045989 A1* | 2/2017 | Lee | G06F 3/0414 |
| 2017/0371461 A1* | 12/2017 | Lee | G06K 9/00 |

FOREIGN PATENT DOCUMENTS

| | | |
|---|---|---|
| KR | 10-1432988 B1 | 8/2014 |
| KR | 10-1493494 B1 | 2/2015 |

* cited by examiner

*Primary Examiner* — Yuzhen Shen
(74) *Attorney, Agent, or Firm* — Lewis Roca Rothgerber Christie LLP

(57) ABSTRACT

A touch panel includes: a substrate having a touch recognition area and a fingerprint recognition area; a plurality of first sensing electrodes in the touch recognition area on the substrate; and a first connection electrode connecting adjacent ones of the first sensing electrodes in a first direction. A portion of the first connection electrode adjacent to the fingerprint recognition area is bent along an edge of the fingerprint recognition area.

12 Claims, 11 Drawing Sheets

TOUCH PANEL AND DISPLAY DEVICE INCLUDING THE SAME

CROSS-REFERENCE TO RELATED APPLICATION

The present application claims priority to and the benefit of Korean Patent Application No. 10-2016-0113169, filed on Sep. 2, 2016, in the Korean Intellectual Property Office (KIPO), the disclosure of which is incorporated by reference herein in its entirety.

BACKGROUND

1. Field

Aspects of some example embodiments of the present invention relate to a touch panel and a display device including the touch panel.

2. Discussion of Related Art

In recent times, capabilities have been added to display devices in addition to the capability of merely displaying images. A display device including a fingerprint recognition sensor is an example thereof.

Fingerprint recognition sensors may utilize, for example, capacitive sensors, an optical sensors, a thermal sensors, and an ultrasonic sensors, for example. Among the different categories of fingerprint recognition sensors, capacitive sensors may utilize an arrangement of adjacent sensing electrodes and recognize a fingerprint using a capacitance difference based on a distance between a ridge and a valley of the fingerprint.

A related art display device may include a display panel, a touch panel on the display panel, a fingerprint sensor on the touch panel, and a cover glass on the fingerprint sensor. As such, because a separate fingerprint sensor may be added for fingerprint recognition, a process may be added and the thickness of the display device may increase.

The above information disclosed in this Background section is only for enhancement of understanding of the background of the inventive concept, and, therefore, it may contain information that does not constitute prior art that is already known in this country to a person of ordinary skill in the art.

SUMMARY

Aspects of some example embodiments of the present invention relate to a touch panel and a display device including the touch panel. Some example embodiments of the present invention include a touch panel having a fingerprint recognition function and a display device including the touch panel.

Example embodiments of the present invention may include a touch panel having a fingerprint recognition function without a separate fingerprint sensor and to a display device including the touch panel.

According to some example embodiments of the present invention, a touch panel includes: a substrate having a touch recognition area and a fingerprint recognition area; a plurality of first sensing electrodes in the touch recognition area on the substrate; and a first connection electrode connecting adjacent ones of the first sensing electrodes in a first direction, wherein a portion of the first connection electrode adjacent to the fingerprint recognition area is bent along an edge of the fingerprint recognition area.

According to some example embodiments, the touch panel may further include: a plurality of second sensing electrodes in the touch recognition area on the substrate, the plurality of second sensing electrodes insulated from the first sensing electrodes; and a second connection electrode connecting adjacent ones of the second sensing electrodes in a second direction intersecting the first direction.

According to some example embodiments, a portion of the second connection electrode adjacent the fingerprint recognition area is bent along the edge of the fingerprint recognition area.

According to some example embodiments, the first sensing electrode and the second sensing electrode have at least one of: a quadrangular shape, a triangular shape, a lozenge shape, a circular shape, an elliptical shape, a semicircular shape, or polygonal shape.

According to some example embodiments, the fingerprint recognition area has at least one of: a quadrangular shape, a triangular shape, a lozenge shape, a circular shape, an elliptical shape, a semicircular shape, or polygonal shape.

According to some example embodiments, the fingerprint recognition area has an area equal to integer multiples of an area of the first sensing electrode.

According to some example embodiments, the first sensing electrode has an area in a range of 3 square millimeters ($mm^2$) to 30 $mm^2$.

According to some example embodiments, the fingerprint recognition area is surrounded by the first sensing electrode and the second sensing electrode.

According to some example embodiments, the fingerprint recognition area is positioned in at least one edge portion of the substrate.

According to some example embodiments of the present invention, a touch panel includes: a substrate having a touch recognition area and a fingerprint recognition area; a plurality of first sensing electrodes in the touch recognition area on the substrate; a first connection electrode connecting adjacent ones of the first sensing electrodes in one direction; a touch driving unit configured to drive the first sensing electrode; and a first routing wiring connecting the first sensing electrode and the touch driving unit, wherein at least one of the plurality of first sensing electrodes adjacent to the fingerprint recognition area is separated from the plurality of first sensing electrodes, and the touch panel further comprises an auxiliary routing wiring connecting the separated first sensing electrode and the touch driving unit.

According to some example embodiments, the touch panel may further include a third sensing electrode and a fourth sensing electrode insulated from each other in the fingerprint recognition area on the substrate.

According to some example embodiments, the touch panel may further include: a fingerprint recognition unit configured to drive the third sensing electrode and the fourth sensing electrode; a third routing wiring connecting the third sensing electrode and the fingerprint recognition unit; and a fourth routing wiring connecting the fourth sensing electrode and the fingerprint recognition unit.

According to some example embodiments, the touch driving unit and the fingerprint recognition unit oppose each other on the substrate.

According to some example embodiments of the present invention, a display device includes: a display panel comprising a plurality of pixels for displaying an image; a touch panel on the display panel, the touch panel including: a plurality of first sensing electrodes in a touch recognition area on the display panel; and a first connection electrode connecting adjacent ones of the first sensing electrodes in one direction; and a cover glass on the first sensing electrode, wherein a portion of the first connection electrode adjacent to a fingerprint recognition area is bent along an edge of the fingerprint recognition area.

According to some example embodiments, the cover glass has a groove in an area corresponding to the fingerprint recognition area.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of aspects of some example embodiments of the present invention will become more apparent by describing in more detail example aspects of some example embodiments thereof with reference to the accompanying drawings, wherein.

DETAILED DESCRIPTION

Aspects of some example embodiments will now be described more fully hereinafter with reference to the accompanying drawings. Although the invention can be modified in various manners and have several embodiments, example embodiments are illustrated in the accompanying drawings and will be described in the specification. However, the scope of the invention is not limited to the example embodiments and should be construed as including all the changes, equivalents, and substitutions included in the spirit and scope of the invention.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Like reference numerals refer to like elements throughout the specification.

Figure 1:
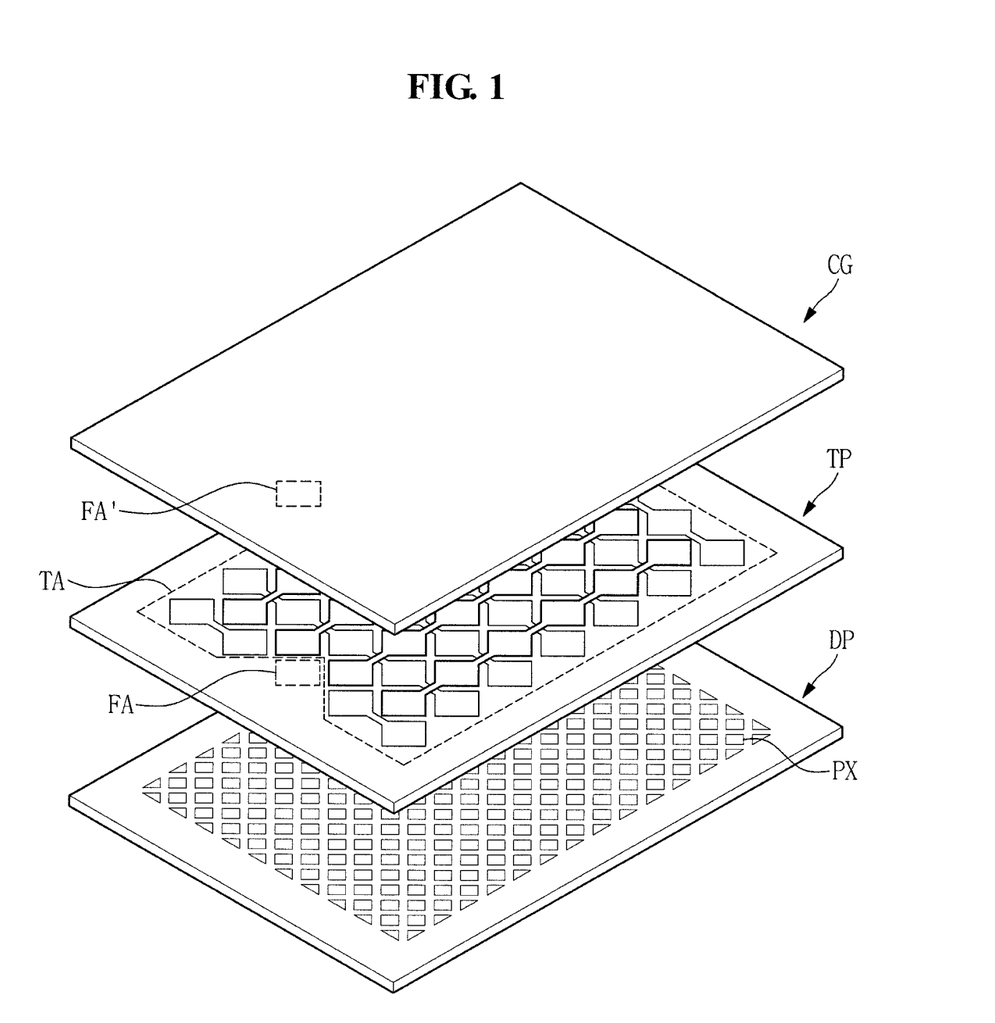
FIG. 1 is a schematic perspective view illustrating a display device according to an example embodiment.

FIG. 1 is a schematic perspective view illustrating a display device according to an example embodiment.

Referring to FIG. 1, the display device according to an example embodiment may include a display panel DP including a plurality of pixels PX for displaying images, a touch panel TP on the display panel DP, and a cover glass CG on the touch panel TP.

In an example embodiment, the display panel DP may be one of: a liquid crystal display (LCD) panel, an organic light emitting diode (OLED) display panel, a plasma display panel (PDP), and/an electrophoretic display (EPD) panel.

The display panel DP may include the plurality of pixels PX arranged in a matrix arrangement. In an example embodiment, the pixel PX is depicted as having a substantially lozenge shape, but example embodiments are not limited thereto. The pixel PX may have various shapes such as a substantially quadrangular shape and a substantially triangular shape.

In addition, although the pixel PX according to an example embodiment is described as including a red pixel, a green pixel, and a blue pixel, example embodiments are not limited thereto. The pixel PX may be at least one selected from the group consisting of: red, green, blue, cyan, magenta, yellow, and white pixels.

The touch panel TP may be arranged or positioned on the display panel DP.

The touch panel TP according to an example embodiment is described on the premise that it has a structure in which a plurality of sensing electrodes are arranged or positioned on a substrate, but example embodiments are not limited thereto. In an example embodiment, the touch panel TP may be an on-cell type to be directly arranged or positioned on the display panel DP without a separate substrate or may be an in-cell type to be formed in the display panel DP.

The touch panel TP may include a touch recognition area TA and a fingerprint recognition area FA on a plane. In an example embodiment, the fingerprint recognition area FA may be at least one edge portion of a substrate 100 on a plane. For example, the fingerprint recognition area FA may be a central portion of at least one edge portion of the substrate 100 on a plane.

However, example embodiments are not limited thereto, and the fingerprint recognition area FA may be an area (e.g., a predetermined area) on the substrate 100, and may include a plurality of areas. A great portion on the substrate 100, excluding the fingerprint recognition area FA, may correspond to the touch recognition area TA.

The fingerprint recognition area FA according to an example embodiment is depicted in FIG. 1 as having a lozenge shape, but example embodiments are not limited thereto. The fingerprint recognition area FA may substantially have a quadrangular shape, a triangular shape, a lozenge shape, a circular shape, an elliptical shape, a semicircular shape, a polygonal shape, or combinations thereof.

In addition, the touch panel TP according to an example embodiment may have a structure in which sensing electrodes for detecting capacitance are disposed on different layers, but example embodiments are not limited thereto. The touch panel TP may have a structure in which the sensing electrodes for detecting capacitance are disposed on substantially a same layer and may be separated from one another using a bridge electrode.

The cover glass CG may be arranged or positioned on the touch panel TP. The cover glass CG may include or be formed of at least one material selected from the group consisting of: glass, sapphire, diamond, polymethylmethacrylate (PMMA), and polycarbonate (PC). The cover glass CG may have a groove in an area FA' corresponding to the fingerprint recognition area FA of the touch panel TP, which will be described in detail below.

Figure 2:
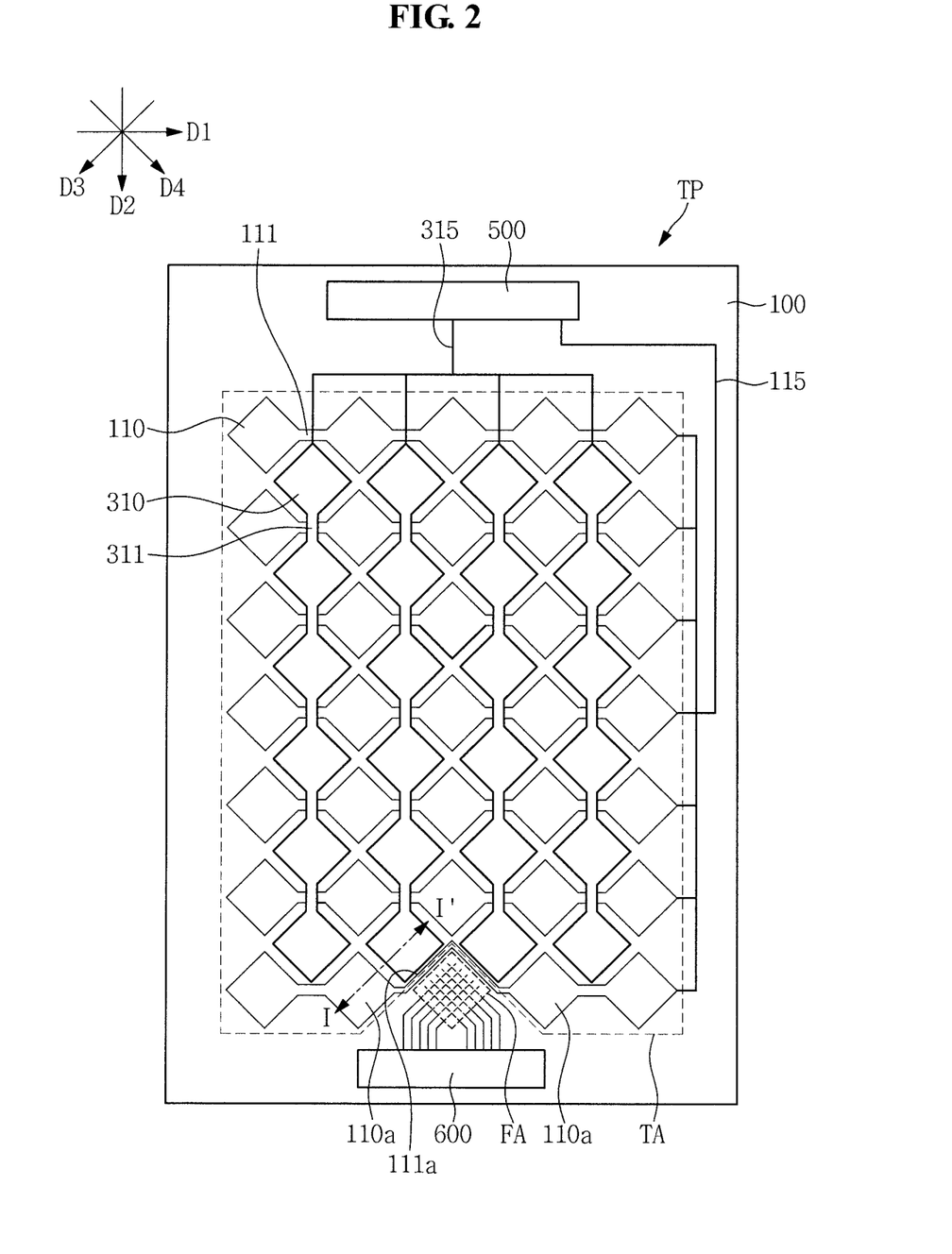
FIG. 2 is a plan view illustrating a touch panel according to an example embodiment.
Figure 3:
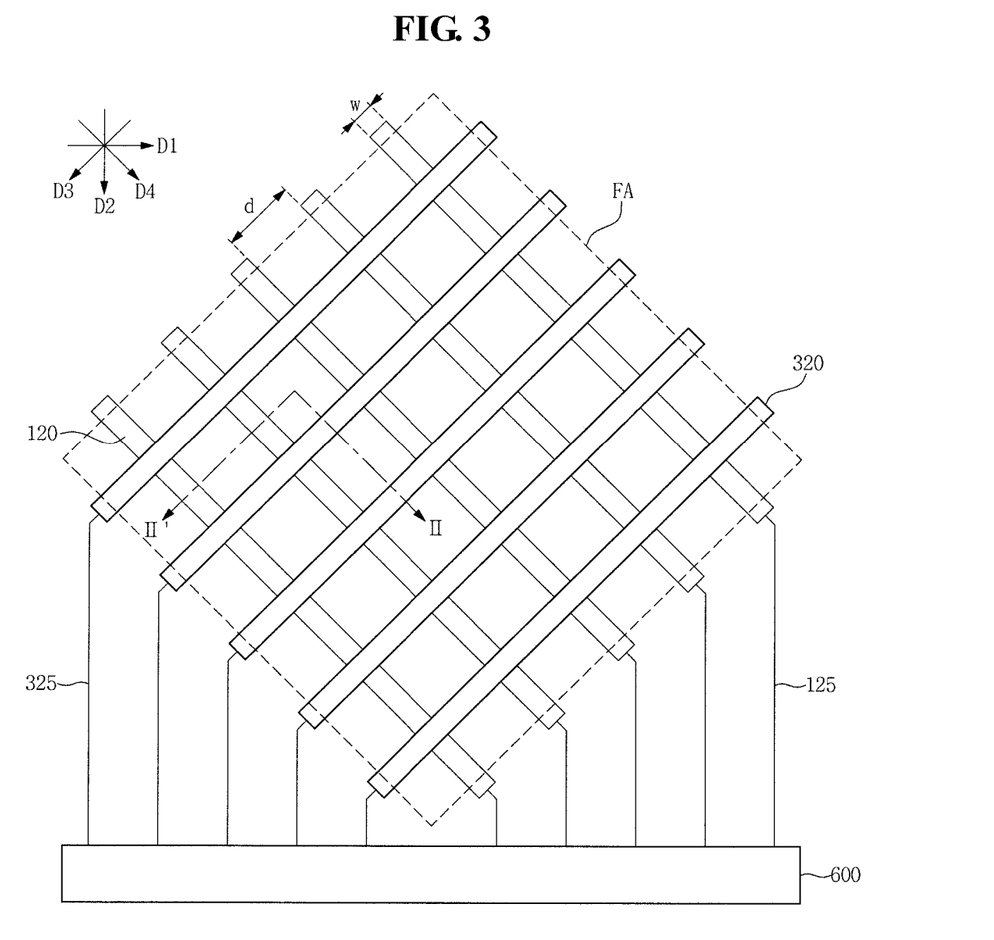
FIG. 3 is a partial enlarged view illustrating a fingerprint recognition area of FIG. 2.
Figure 4:
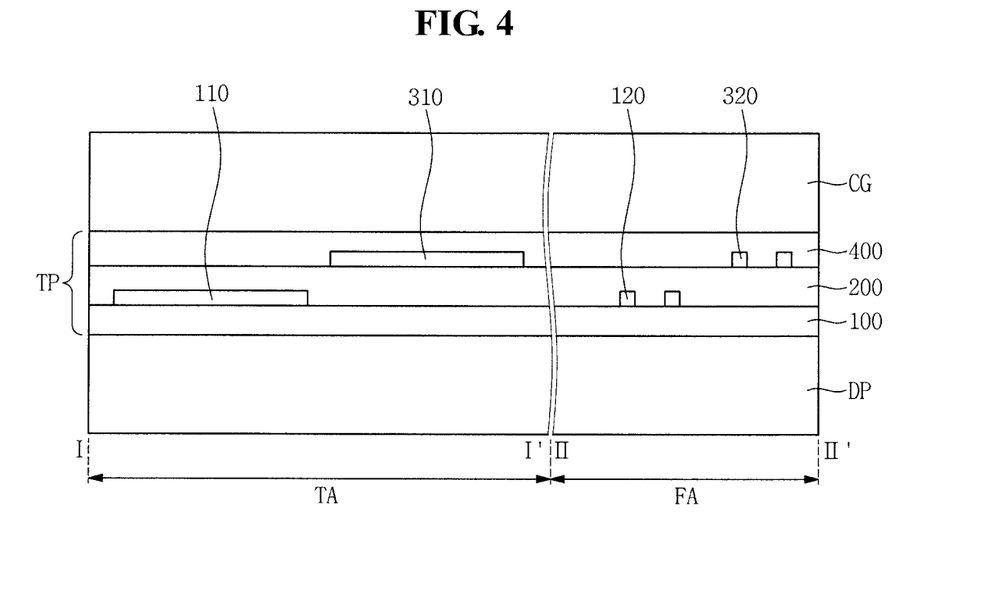
FIG. 4 is a cross-sectional view taken along the line I-I' of FIG. 2 and the line II-II' of FIG. 3.
Figure 5:
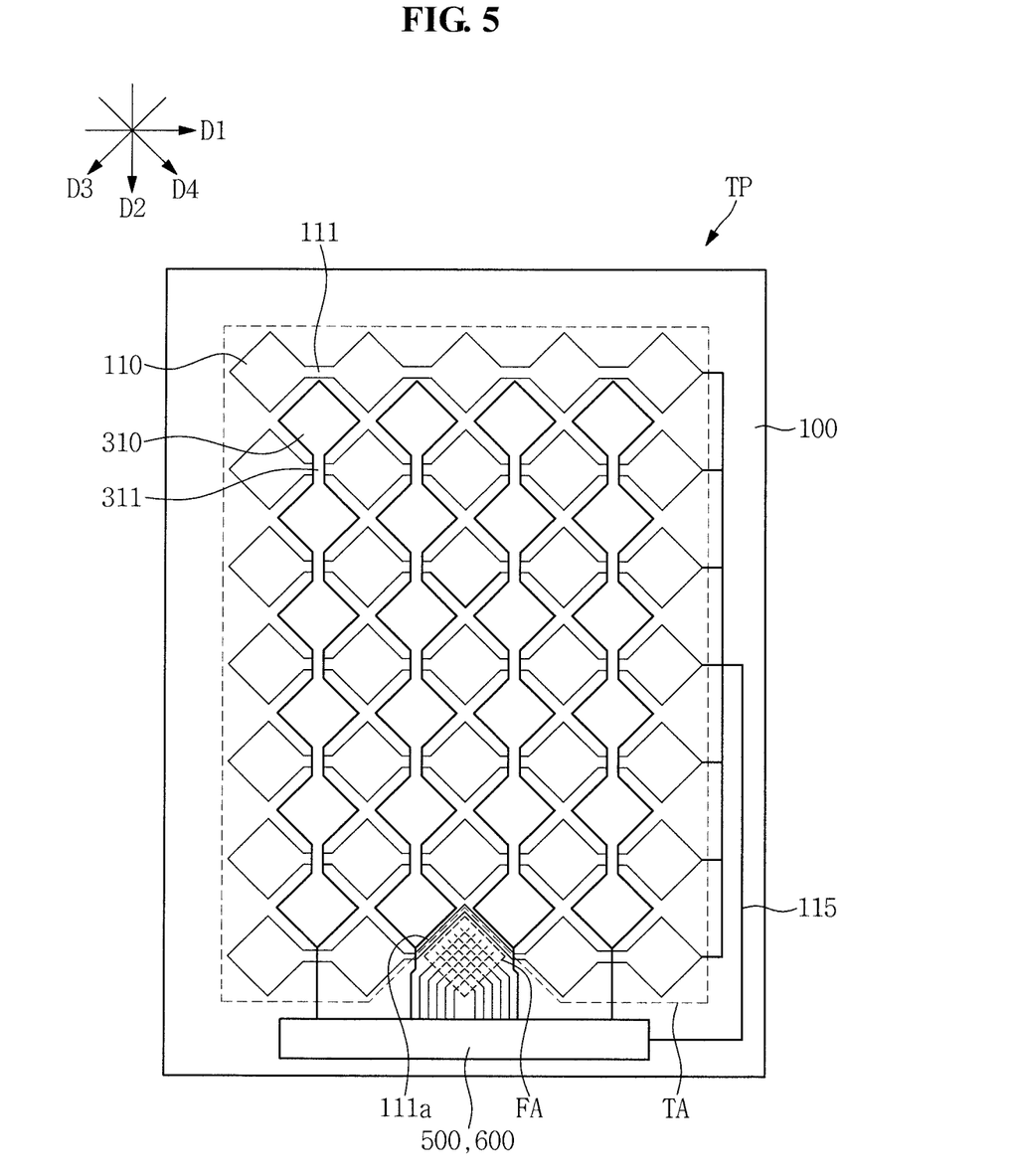
FIG. 5 is a plan view illustrating a touch panel according to some example embodiments.

FIG. 2 is a plan view illustrating a touch panel according to an example embodiment, FIG. 3 is a partial enlarged view illustrating the fingerprint recognition area of FIG. 2, FIG. 4 is a cross-sectional view taken along line I-I' of FIG. 2 and line II-II' of FIG. 3, and FIG. 5 is a plan view illustrating a touch panel according to alternative example embodiments.

Referring to FIGS. 2, 3, and 4, the touch panel TP according to an example embodiment includes: the substrate 100 including a touch recognition area TA and a fingerprint recognition area FA; a plurality of first sensing electrodes 110 in the touch recognition area TA on the substrate 100; a first connection electrode 111 connecting adjacent ones of the first sensing electrodes 110 in a first direction D1; a plurality of third sensing electrodes 120 in the fingerprint recognition area FA on the substrate 100; a first insulating layer 200 on the first sensing electrode 110, the first connection electrode 111, and the third sensing electrode 120; a plurality of second sensing electrodes 310 in the touch recognition area TA on the first insulating layer 200; a second connection electrode 311 connecting adjacent ones of the second sensing electrodes 310 in a second direction D2 intersecting the first direction D1; a fourth sensing electrode 320 in the fingerprint recognition area FA on the first insulating layer 200; and a second insulating layer 400 on the second sensing electrode 310, the second connection electrode 311, and the fourth sensing electrode 320.

The first sensing electrode 110 and the second sensing electrode 310 may be arranged or positioned on a plane so as not to overlap each other. The first connection electrode 111 and the second connection electrode 311 may intersect each other on a plane (e.g., from a plan or top view).

Although the first sensing electrode 110 and the second sensing electrode 310 are depicted as each having a shape of a lozenge-shaped (e.g., diamond-shaped) planar electrode in FIG. 2, example embodiments are not limited thereto. In an example embodiment, the first sensing electrode 110 and the second sensing electrode 310 may each substantially have a quadrangular shape, a triangular shape, a lozenge shape, a circular shape, an elliptical shape, a semicircular shape, a polygonal shape, or combinations thereof.

The first sensing electrode 110, the first connection electrode 111, the second sensing electrode 310, and the second connection electrode 311 may have a mesh shape.

The first sensing electrode 110 and the second sensing electrode 310 may have suitable sizes to detect a touch input based on the size and purpose of use of the display device. For example, the first sensing electrode 110 and the second sensing electrode 310 may have an area ranging from about several (e.g., 3) square millimeters ($mm^2$) to about several tens of square millimeters (e.g., 30 $mm^2$).

In the touch panel TP according to an example embodiment, the fingerprint recognition area FA is depicted as having substantially a same area as an area of one of the first sensing electrode 110 or the second sensing electrode 310, but example embodiments are not limited thereto. An area of the fingerprint recognition area FA may be integer multiples (e.g., or about integer multiples) (e.g., in a range of twice to five times) of an area of one of the first sensing electrode 110 or the second sensing electrode 310, or may have a suitable value based on the size and purpose of use of the display device.

The first sensing electrode 110, the first connection electrode 111, the second sensing electrode 310, and the second connection electrode 311 may include a metal or a transparent conductive oxide (TCO). Such a TCO may include at least one material selected from the group consisting of: indium tin oxide (ITO), indium zinc oxide (IZO), zinc oxide (ZnO), carbon nanotube (CNT), or graphene.

Referring to FIG. 2, a first connection electrode 111a connecting first sensing electrodes 110a adjacent to the fingerprint recognition area FA may be bent along an edge of the fingerprint recognition area FA. In the case where the second connection electrode 311 connecting the second sensing electrodes 310 is arranged or positioned adjacent to the fingerprint recognition area FA, the second connection electrode 311 may be also bent along the edge of the fingerprint recognition area FA.

The first sensing electrode 110 may be electrically connected to a first routing wiring 115 and the second sensing electrode 120 may be electrically connected to a second routing wiring 315. The first routing wiring 115 and the second routing wiring 315 may be connected to a touch driving unit 500.

The touch driving unit 500 inputs a driving signal to the first sensing electrode 110, and may detect the presence of a touch input and touch coordinates based on a capacitance variation and a voltage variation measured by the second sensing electrode 310.

The touch driving unit 500 may be arranged or positioned directly on the substrate 100 in the form of an IC or may be provided as a separate configuration. The touch driving unit 500 may be arranged or positioned on the substrate 100 to oppose a fingerprint recognition unit 600 to be described below.

For example, as illustrated in FIG. 2, in the case where the touch driving unit 500 is arranged or positioned at an upper portion of the substrate 100 from a plane, the fingerprint recognition unit 600 may be arranged or positioned at a lower portion of the substrate 100 from a plane. Similarly, in the case where the touch driving unit 500 is arranged or positioned at a lower portion of the substrate 100 from a plane, the fingerprint recognition unit 600 may be arranged or positioned at an upper portion of the substrate 100 from a plane.

However, example embodiments are not limited thereto, and the touch driving unit 500 and the fingerprint recognition unit 600 may be arranged or positioned on substantially a same side of the substrate 100 as illustrated in FIG. 5. In addition, the touch driving unit 500 and the fingerprint recognition unit 600 may be provided in the form of a single integrated circuit (IC).

The touch panel TP according to an example embodiment may include, in the fingerprint recognition area FA on the substrate 100, a third sensing electrode 120 extending in a fourth direction D4 and including a plurality of third sensing electrodes 120 arranged along a third direction D3 which intersects the fourth direction D4, and a fourth sensing electrode 320 extending in the third direction D3 and including a plurality of fourth sensing electrodes 320 arranged along the fourth direction D4. The fourth sensing electrode 320 is insulated from the third sensing electrode 120. The accuracy of fingerprint sensing in the fingerprint recognition area FA may vary depending on the density of the third sensing electrode 120 and the fourth sensing electrode 320.

Although FIG. 3 illustrates an example in which five third sensing electrodes 120 are arranged along the third direction D3 and five fourth sensing electrodes 320 are arranged along the fourth direction D4, the number of the third sensing electrodes 120 and the number of the fourth sensing electrodes 320 are not limited thereto. The number of the third sensing electrodes 120 and the number of the fourth sensing electrodes 320 may vary according to a desired accuracy level of fingerprint sensing.

Although the third sensing electrode 120 and the fourth sensing electrode 320 according to an example embodiment are depicted as each having a bar shape, example embodiments are not limited thereto. The third sensing electrode 120 and the fourth sensing electrode 320 may have a structure including a bar-shaped stem portion and a branch portion branching off from the stem portion. The third sensing electrode 120 and the fourth sensing electrode 320 may be arranged or positioned to intersect each other on a plane.

In addition, the third sensing electrode 120 and the fourth sensing electrode 320 may have the form of a mesh having significantly narrow line width w and distance d in a range of about several micrometers (μm) to about several tens of micrometers.

In addition, the third sensing electrode 120 and the fourth sensing electrode 320 may be arranged or positioned in a boundary area of the plurality of pixels PX on the display panel DP. That is, the third sensing electrode 120 and the fourth sensing electrode 320 may be arranged or positioned in a shape surrounding each of the pixels PX on a plane.

The third sensing electrode 120 and the fourth sensing electrode 320 may include a metal or a TCO. Such a TCO may include at least one material selected from the group consisting of: ITO, IZO, ZnO, CNT, and graphene.

The third sensing electrode 120 may be electrically connected to a third routing wiring 125 and the fourth sensing electrode 320 may be electrically connected to a fourth routing wiring 325. The third routing wiring 125 and the fourth routing wiring 325 may be connected to the fingerprint recognition unit 600.

The fingerprint recognition unit 600 inputs a driving signal to the third sensing electrode 120, and may recognize fingerprints based on a capacitance variation or a voltage variation measured by the fourth sensing electrode 320.

For example, when a touch action is performed to the fingerprint recognition area FA for a predetermine time or more, the fingerprint recognition unit 600 may recognize the touched fingerprint and generate a fingerprint information.

A fingerprint is a raised wrinkle at the last joint of human fingers and includes a ridge and a valley between the ridges. That is, when a finger contacts the fingerprint recognition area FA, the ridge contacts the fingerprint recognition area FA, but the valley does not. That is, coordinates at which a capacitance measured by the fourth sensing electrode 320 changes may correspond to a ridge, and coordinates at which a capacitance does not change may correspond to a valley. In such a manner, fingerprints may be recognized or measured.

The fingerprint recognition unit 600 may be directly arranged or positioned on the display panel DP in the form of an integrated circuit (IC) or may be provided as a separate configuration.

Figure 6:
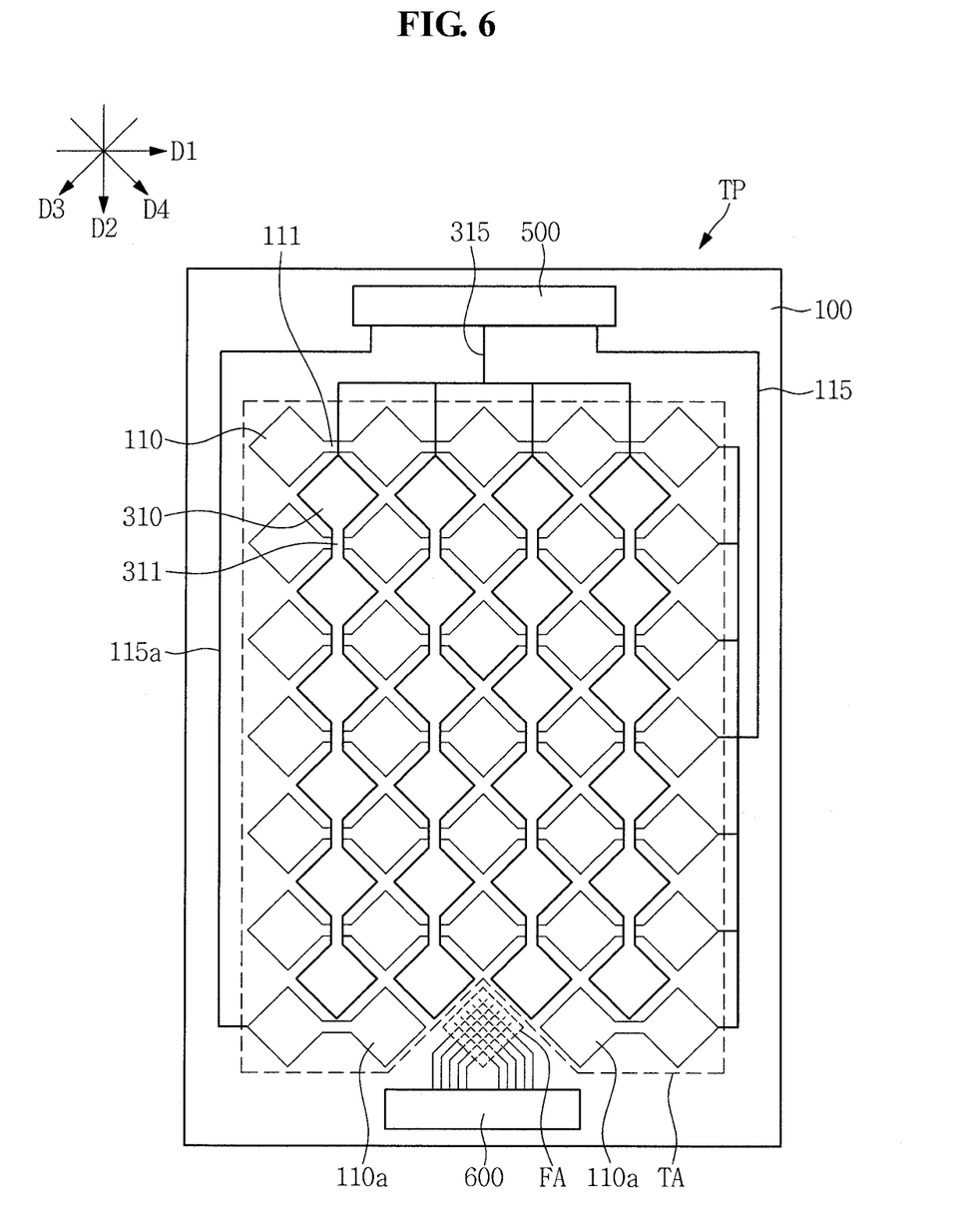
FIG. 6 is a plan view illustrating a touch panel according to some example embodiments.

FIG. 6 is a plan view illustrating a touch panel TP according to alternative example embodiments. The repeated descriptions of the touch panel according to an example embodiment will be omitted from the descriptions of the touch panel according to alternative example embodiments.

Referring to FIG. 6, the touch panel TP according to alternative example embodiments may include a substrate 100 including a touch recognition area TA and a fingerprint recognition area FA, a plurality of first sensing electrodes 110 and a plurality of second sensing electrodes 310 in the touch recognition area TA on the substrate 100, a first connection electrode 111 connecting adjacent ones of the first sensing electrodes 110 in a first direction D1, a second connection electrode 311 connecting adjacent ones of the second sensing electrodes 310 in a second direction D2, a first routing wiring 115 connected to the first sensing electrode 110, a second routing wiring 315 connected to the second sensing electrode 310, a touch driving unit 500, and a fingerprint recognition unit 600.

In the touch panel TP according to alternative example embodiments, the fingerprint recognition area FA may be a central portion of an edge portion of the substrate 100. In the touch panel TP according to alternative example embodiments, a first connection electrode that connects first sensing electrodes 110a adjacent to the fingerprint recognition area FA may be omitted. In addition, an auxiliary routing wiring 115a connecting the touch driving unit 500 and the first sensing electrodes 110a separated by the omitted first connection electrode may be further provided.

The auxiliary routing wiring 115a may be arranged or positioned to oppose the first routing wiring 115. For example, as illustrated in FIG. 6, in the case where the first routing wiring 115 is arranged or positioned at a right portion of the substrate 100, the auxiliary routing wiring 115a may be arranged or positioned at a left portion of the substrate 100. Similarly, in the case where the first routing wiring 115 is arranged or positioned at an upper portion of the substrate 100, the auxiliary routing wiring 115a may be arranged or positioned at a lower portion of the substrate 100. The second routing wiring 315 may be provided in the same manner.

Figure 7:
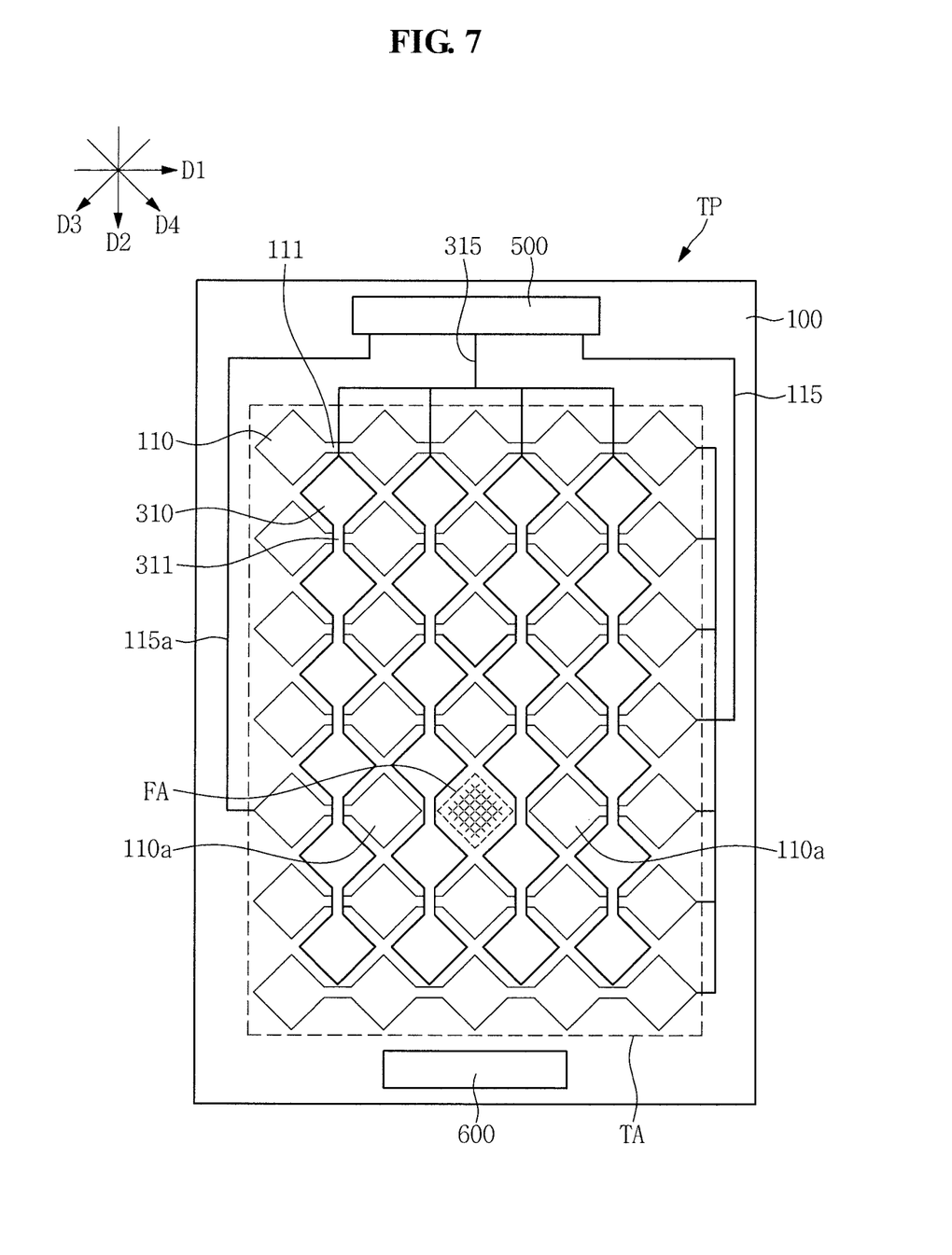
FIG. 7 is a plan view illustrating a touch panel according to some example embodiments.

FIG. 7 is a plan view illustrating a touch panel TP according to alternative example embodiments. The repeated descriptions of the touch panel according to an example embodiment will be omitted from the descriptions of the touch panel according to alternative example embodiments.

Referring to FIG. 7, the touch panel TP according to alternative example embodiments may include a substrate 100 including a touch recognition area TA and a fingerprint recognition area FA, a plurality of first sensing electrodes 110 and a plurality of second sensing electrodes 310 in the touch recognition area TA on the substrate 100, a first connection electrode 111 connecting adjacent ones of the first sensing electrodes 110 in a first direction D1, a second connection electrode 311 connecting adjacent ones of the second sensing electrodes 310 in a second direction D2, a first routing wiring 115 connected to the first sensing electrode 110, a second routing wiring 315 connected to the second sensing electrode 310, a touch driving unit 500, and a fingerprint recognition unit 600.

In the touch panel TP according to alternative example embodiments, the fingerprint recognition area FA may be a predetermined area on the substrate 100. For example, the fingerprint recognition area FA may be surrounded by the first sensing electrode 110 and the second sensing electrode 310 on a plane.

In the touch panel TP according to alternative example embodiments, a first connection electrode connecting first sensing electrodes 110a adjacent to the fingerprint recognition area FA may be omitted, and an auxiliary routing wiring 115a connecting the touch driving unit 500 and the first sensing electrodes 110a separated by the omitted first connection electrode may be further provided.

Figure 8:
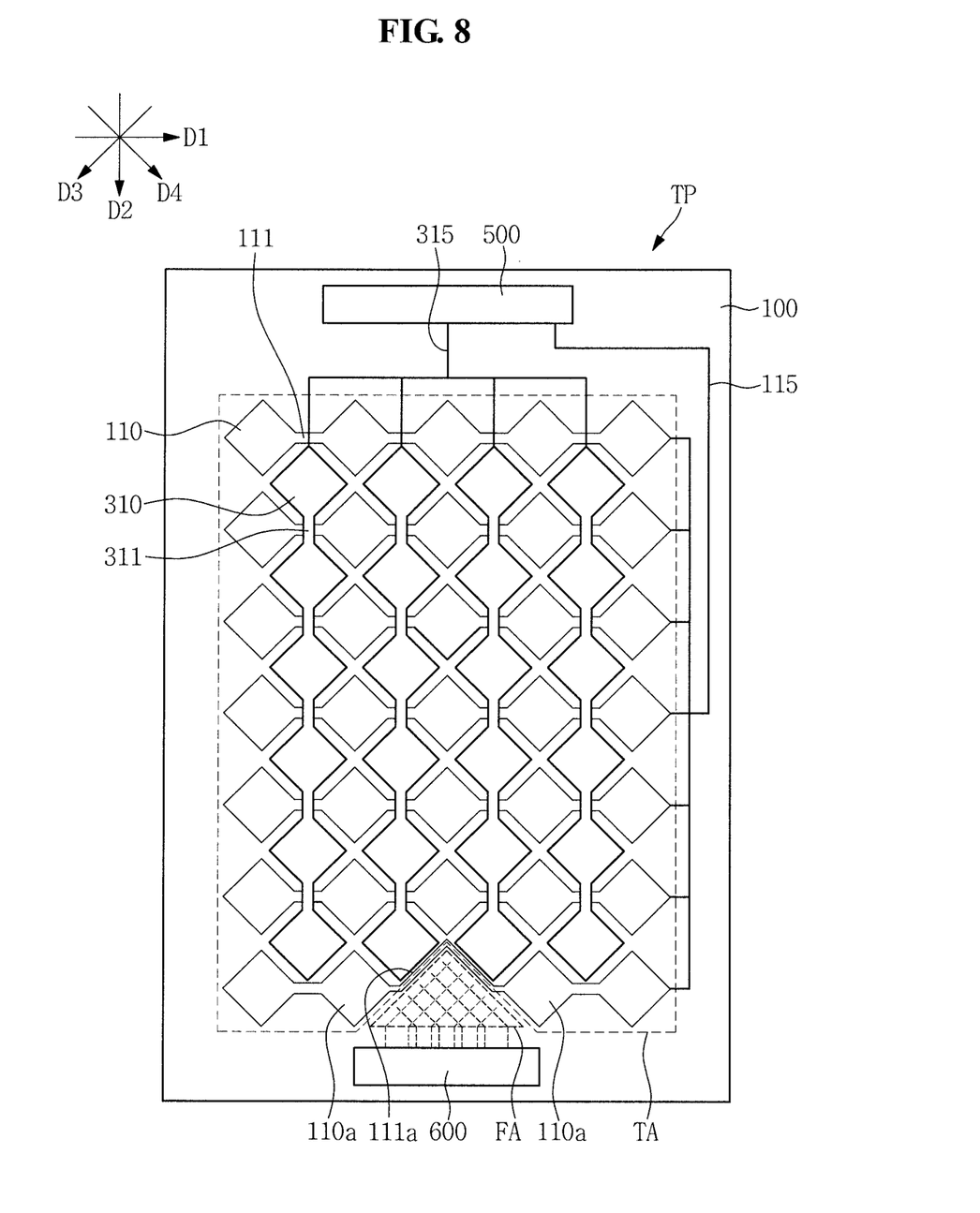
FIG. 8 is a plan view illustrating a touch panel according to some example embodiments.
Figure 9:
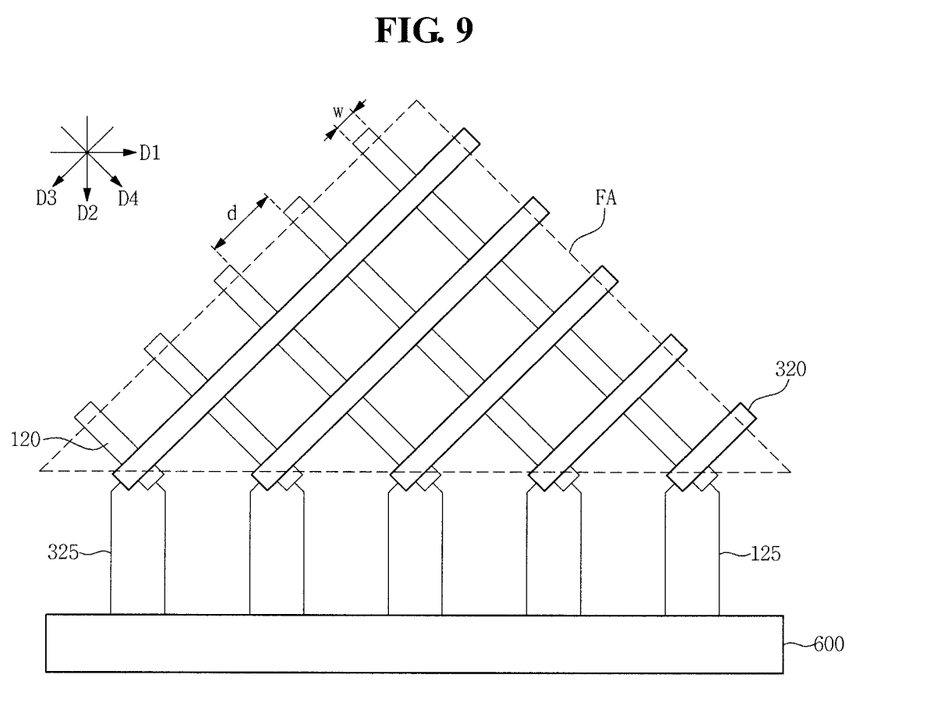
FIG. 9 is a partial enlarged view illustrating a fingerprint recognition area of FIG. 8.

FIG. 8 is a plan view illustrating a touch panel TP according to alternative example embodiments, and FIG. 9 is a partial enlarged view illustrating a fingerprint recognition area FA of FIG. 8. The repeated descriptions of the touch panel according to an example embodiment will be omitted from the descriptions of the touch panel according to alternative example embodiments.

Referring to FIGS. 8 and 9, the fingerprint recognition area FA according to alternative example embodiments may have substantially a triangular shape. The touch panel TP according to alternative example embodiments may include, in the fingerprint recognition area FA on a substrate 100, a third sensing electrode 120 extending in a fourth direction D4 and including a plurality of third sensing electrodes 120 arranged along a third direction D3 which intersects the fourth direction D4, and a fourth sensing electrode 320 extending in the third direction D3 and including a plurality of fourth sensing electrodes 320 arranged along the fourth direction D4. The fourth sensing electrode 320 is insulated from the third sensing electrode 120. The accuracy of fingerprint sensing in the fingerprint recognition area FA may vary depending on the density of the third sensing electrodes 120 and the fourth sensing electrodes 320.

Although FIG. 9 illustrates an example in which five third sensing electrodes 120 are arranged along the third direction D3 and five fourth sensing electrodes 320 are arranged along the fourth direction D4, the number of the third sensing electrodes 120 and the number of the fourth sensing electrodes 320 are not limited thereto. The number of the third sensing electrodes 120 and the number of the fourth sensing electrodes 320 may vary according to a desired accuracy level of fingerprint sensing.

The third sensing electrode 120 and the fourth sensing electrode 320 according to the present example embodiment are depicted as each having a bar shape, but example embodiments are not limited thereto. The third sensing electrode 120 and the fourth sensing electrode 320 may have a structure including a bar-shaped stem portion and a branch portion branching off from the stem portion. The third sensing electrode 120 and the fourth sensing electrode 320 may be arranged or positioned to intersect each other on a plane.

In addition, the third sensing electrode 120 and the fourth sensing electrode 320 may have the form of a mesh having significantly narrow line width w and distance d in a range of about several micrometers (μm) to about several tens of micrometers.

In addition, the third sensing electrode 120 and the fourth sensing electrode 320 may be arranged or positioned in a boundary area of the plurality of pixels PX on the display panel DP. That is, the third sensing electrode 120 and the fourth sensing electrode 320 may be arranged or positioned in a shape surrounding each of the pixels PX on a plane.

The third sensing electrode 120 may be electrically connected to a third routing wiring 125 and the fourth sensing electrode 320 may be electrically connected to a fourth routing wiring 325. The third routing wiring 125 and the fourth routing wiring 325 may be connected to a fingerprint recognition unit 600.

Figure 10:
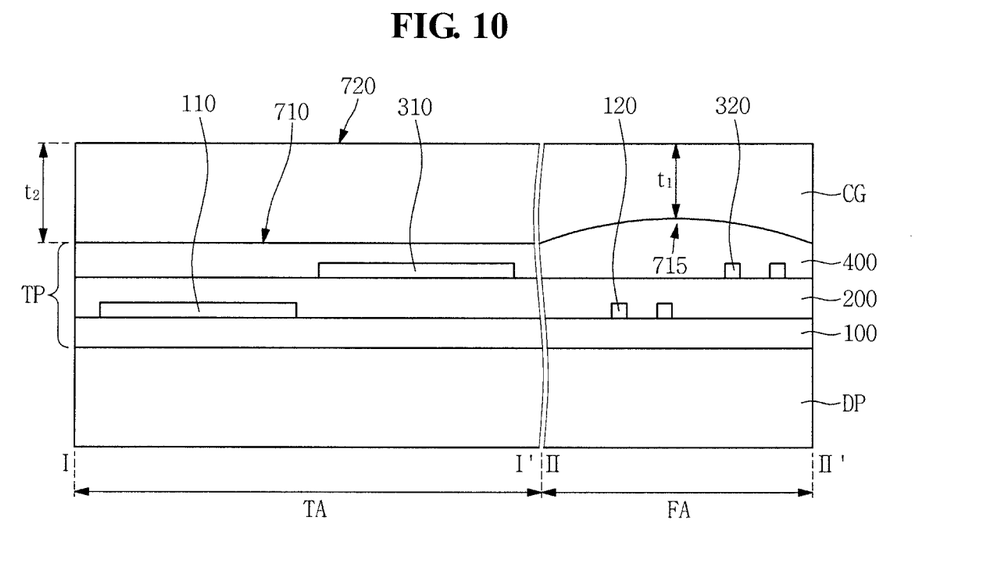
FIG. 10 is a cross-sectional view illustrating a display device according to some example embodiments.
Figure 11:
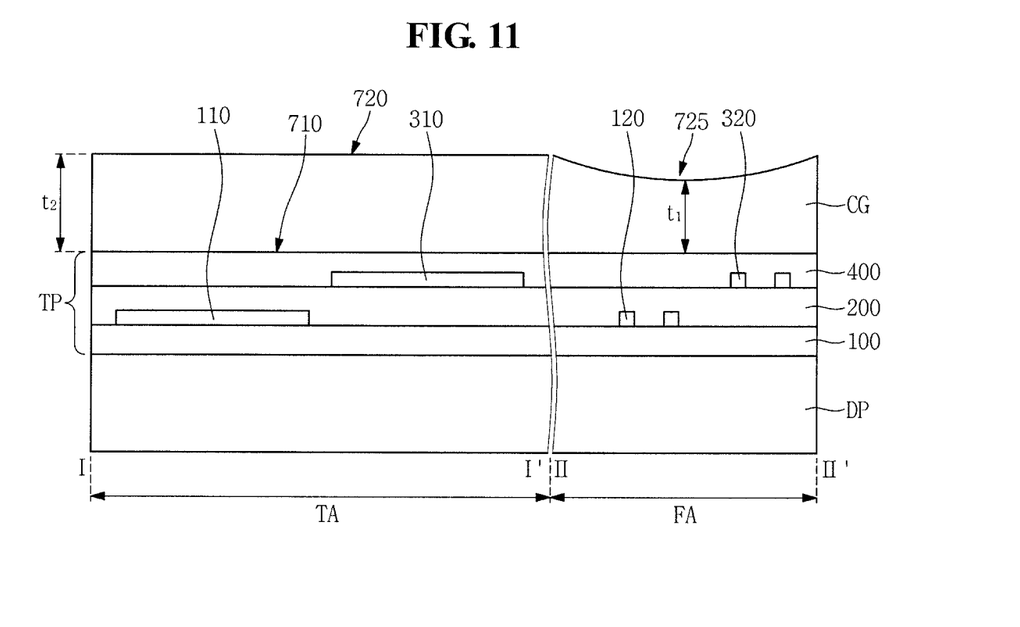
FIG. 11 is a cross-sectional view illustrating a display device according to some example embodiments.

FIGS. 10 and 11 are cross-sectional views illustrating display devices according to alternative example embodiments. The repeated descriptions of the display device according to an example embodiment will be omitted from the descriptions of the display device according to alternative example embodiments.

Referring to FIGS. 10 and 11, the display device according to alternative example embodiments may include a display panel DP, a touch panel TP on the display panel DP, and a cover glass CG on the touch panel TP.

The touch panel TP may include a substrate 100, a first sensing electrode 110 in a touch recognition area TA on the substrate 100, a third sensing electrode 120 in a fingerprint recognition area FA on the substrate 100, a first insulating layer 200 on the first sensing electrode 110 and the third sensing electrode 120, a second sensing electrode 310 in the touch recognition area TA on the first insulating layer 200, a fourth sensing electrode 320 in the fingerprint recognition area FA on the first insulation layer 200, and a second insulating layer 400 on the second sensing electrode 310 and the fourth sensing electrode 320.

The cover glass CG may include a first surface 710 facing the touch panel TP and a second surface 720 opposing the first surface 710 and exposed outwards.

The cover glass CG may have a groove in an area corresponding to the fingerprint recognition area FA. Referring to FIG. 10, the cover glass CG may have a groove 715 in the first surface 710 facing the touch panel TP. In addition, referring to FIG. 11, the cover glass CG may have a groove 725 in the second surface 720 exposed outwards.

Referring to FIGS. 10 and 11, the cover glass CG may have grooves 715 and 725 having arch-shaped cross-sections. However, example embodiments are not limited thereto, and the grooves 715 and 725 may have cross-sections having a quadrangular or trapezoidal shape, for example.

The cover glass CG may have a minimum thickness t1 in an area where the grooves 715 and 725 are defined. The minimum thickness t1 may be in a range of 5% to 95% (e.g., about 5% to about 95%) of a thickness t2 of the cover glass CG. For example, the minimum thickness t1 may be in a range of 5% to 30% (e.g., about 5% to about 30%) of the thickness t2 of the cover glass CG.

According to example embodiments, the thickness t2 of the cover glass CG may be in a range of about 450 μm to about 550 μm. In addition, the minimum thickness t1 in an area where the grooves 715 and 725 are defined may be in a range of about 150 μm to about 250 μm.

According to example embodiments, the display device may improve the sensitivity of the fingerprint recognition sensor while substantially minimizing rigidity degradation of the cover glass CG by defining the arch-shaped groove in an area of the cover glass CG corresponding to the fingerprint recognition area FA.

As set forth hereinabove, in one or more example embodiments, the touch panel and the display device including the touch panel include a fingerprint sensor on a same layer as a layer on which the touch panel is arranged or positioned, but in a different area from an area in which the touch panel is arranged or positioned, rather than having a separate layer for arranging or positioning the fingerprint sensor, such that the thickness of the display device may be reduced.

In addition, in one or more example embodiments, the touch panel and the display device including the touch panel, which include the fingerprint sensor on a same layer as a layer on which the touch panel is arranged or positioned, but in a different area from an area in which the touch panel is arranged or positioned, may provide a wiring structure of a touch sensor and a fingerprint sensor.

While the present invention has been shown and described with reference to the example embodiments thereof, it will be apparent to those of ordinary skill in the art that various changes in form and detail may be made thereto without departing from the spirit and scope of the present invention.

What is claimed is:

1. A touch panel comprising:
a substrate having a touch recognition area and a fingerprint recognition area;
a plurality of first sensing electrodes in the touch recognition area on the substrate; and
a first connection electrode connecting adjacent ones of the first sensing electrodes in a first direction,
wherein a portion of the first connection electrode adjacent to the fingerprint recognition area is bent along an edge of the fingerprint recognition area, and
wherein the adjacent ones of the first sensing electrodes comprise a first-first sensing electrode and a first-second sensing electrode spaced apart from each other, and
the fingerprint recognition area is positioned between the first-first sensing electrode and the first-second sensing electrode,
the first connection electrode connects the first-first sensing electrodes to the first-second sensing electrode.

2. The touch panel as claimed in claim 1, further comprising:
a plurality of second sensing electrodes in the touch recognition area on the substrate, the plurality of second sensing electrodes insulated from the first sensing electrodes; and
a second connection electrode connecting adjacent ones of the second sensing electrodes in a second direction intersecting the first direction.

3. The touch panel as claimed in claim 2, wherein a portion of the second connection electrode adjacent the fingerprint recognition area is bent along the edge of the fingerprint recognition area.

4. The touch panel as claimed in claim 2, wherein the first sensing electrode and the second sensing electrode have at least one of: a quadrangular shape, a triangular shape, a lozenge shape, a circular shape, an elliptical shape, a semicircular shape, or polygonal shape.

5. The touch panel as claimed in claim 2, wherein the fingerprint recognition area is surrounded by the first sensing electrode and the second sensing electrode.

6. The touch panel as claimed in claim 1, wherein the fingerprint recognition area has at least one of: a quadrangular shape, a triangular shape, a lozenge shape, a circular shape, an elliptical shape, a semicircular shape, or polygonal shape.

7. The touch panel as claimed in claim 1, wherein the fingerprint recognition area has an area equal to integer multiples of an area of the first sensing electrode.

8. The touch panel as claimed in claim 1, wherein the first sensing electrode has an area in a range of 3 square millimeters (mm2) to 30 mm2.

9. The touch panel as claimed in claim 1, wherein the fingerprint recognition area is positioned in at least one edge portion of the substrate.

10. The touch panel as claimed in claim 1, wherein the plurality of first sensing electrodes comprises a first-third sensing electrode and a first-fourth sensing electrode which are adjacent to the fingerprint recognition area, and
wherein the first connection electrode comprises a first portion substantially parallel to an edge of the first-third sensing electrode and a second portion substantially parallel to an edge of the first-fourth sensing electrode of the adjacent ones of the first sensing electrodes.

11. A display device comprising:
a display panel comprising a plurality of pixels for displaying an image;
a touch panel on the display panel, the touch panel comprising:
a plurality of first sensing electrodes in a touch recognition area on the display panel; and
a first connection electrode connecting adjacent ones of the first sensing electrodes in one direction; and
a cover glass on the first sensing electrode,
wherein a portion of the first connection electrode adjacent to a fingerprint recognition area is bent along an edge of the fingerprint recognition area, and
wherein the adjacent ones of the first sensing electrodes comprise a first-first sensing electrode and a first-second sensing electrode spaced apart from each other, and the fingerprint recognition area is positioned between the first-first sensing electrode and the first-second sensing electrode, the first connection electrode connects the first-first sensing electrodes to the first-second sensing electrode.

12. The display device as claimed in claim 11, wherein the cover glass has a groove in an area corresponding to the fingerprint recognition area.

\* \* \* \* \*